(12) United States Patent
Zhao et al.

(10) Patent No.: US 7,961,682 B2
(45) Date of Patent: Jun. 14, 2011

(54) HANDOFF BETWEEN BASE STATIONS OF DIFFERENT PROTOCOL REVISIONS IN A CDMA SYSTEM

(75) Inventors: Lijun Zhao, San Diego, CA (US); Jun Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1226 days.

(21) Appl. No.: 10/122,289

(22) Filed: Apr. 11, 2002

(65) Prior Publication Data

US 2003/0193911 A1    Oct. 16, 2003

(51) Int. Cl.
H04W 4/00    (2009.01)
(52) U.S. Cl. ........................................ 370/331; 455/436
(58) Field of Classification Search .................. 370/331; 455/436, 439
See application file for complete search history.

(56) References Cited

U.S. PATENT DOCUMENTS

| | | | |
|---|---|---|---|
| 5,267,261 A | 11/1993 | Blakeney, II et al. | |
| 6,567,666 B2 * | 5/2003 | Czaja et al. | 455/442 |
| 6,714,987 B1 * | 3/2004 | Amin et al. | 709/249 |
| 6,804,519 B1 * | 10/2004 | Czaja et al. | 455/442 |
| 6,954,445 B1 * | 10/2005 | Wang et al. | 370/335 |
| 2001/0030953 A1 * | 10/2001 | Chang | 370/331 |
| 2002/0041576 A1 * | 4/2002 | Chang et al. | 370/331 |
| 2002/0085514 A1 * | 7/2002 | Illidge et al. | 370/329 |
| 2002/0176382 A1 * | 11/2002 | Madour et al. | 370/331 |
| 2004/0157609 A1 * | 8/2004 | Jalloul et al. | 455/442 |
| 2005/0164731 A1 * | 7/2005 | Chang | 455/550.1 |

FOREIGN PATENT DOCUMENTS

| | | |
|---|---|---|
| CN | 1260648 | 7/2000 |
| EP | 1 292 169 A2 | 3/2003 |
| TW | 444453 B | 7/2001 |
| TW | 469720 B | 12/2001 |
| TW | 480849 B | 3/2002 |
| WO | WO 01/10159 A1 | 2/2001 |
| WO | WO 01/78240 A2 | 10/2001 |

OTHER PUBLICATIONS

International Search Report—PCT/US03/011071, International Search Authority—European Patent Office—Jul 25, 2003.
3GPP2 C.S0001-A v5.0, "Introduction to cdma 2000 Spread Spectrum Systems", Published Apr. 2002, TIA/EIA/IS-2000.1-A-2.
3GPP2 C.S0002-A v6.0, "Physical Layer Standard for Spread Spectrum Systems", TIA/EIA/IS-2000.2-A-2, Published Apr. 2002.
3GPP2 C.S0003-A v6:0, "Medium Access Control (MAC) Standard for Spread Spectrum Systems", TIA/EIA/IS-2000.3-,A-2, Published Apr. 2002.

(Continued)

*Primary Examiner* — Chi H Pham
*Assistant Examiner* — Mohammad S Adhami
(74) *Attorney, Agent, or Firm* — Donald C. Kordich

(57) ABSTRACT

Techniques for supporting handoff of a terminal between base stations of different protocol revisions (P_REVs) in a CDMA system. The terminal is handed off from a first base station (with a first P_REV) to a second base station (with a second P_REV) while it is in an active (data or voice) call with the first base station. The second P_REV is later than the first P_REV. The active call may be maintained between the terminal and second base station using a first service configuration previously established via the first base station for the active call. A second service configuration may be established via the second base station for the active call. This may be achieved by (1) querying the terminal, (2) assignment by the second base station, or (3) initiation by the terminal. The active call may then be maintained using the second service configuration if available.

42 Claims, 13 Drawing Sheets

OTHER PUBLICATIONS

3GPP2 C.S0004-A v6.0 "Signaling Link Access Control (LAC),", Published Apr. 2002, TIA/EIA/IS-2000.4-A-2.

3GPP2 C.S0006-A v6.0, "Analog Signaling Standard for cdma2000 Spread Spectrum Systems," TIA/EIA/IS-2000.6-A-2, Published Apr. 2002.

TIA/EIA-95-B, "Mobile Station—Base Station Compatibility Standard for Wideband Spread Spectrum Cellular Systems".

3GPP2 C:S0005-A v6.0, "Upper Layer (Layer 3) Signaling," TIA/EIA/IS-2000.5-A-2, Published Apr. 2002.

Taiwan Search Report—Application No. 092108408, TIPO, Apr. 1, 2009.

* cited by examiner

HANDOFF BETWEEN BASE STATIONS OF DIFFERENT PROTOCOL REVISIONS IN A CDMA SYSTEM

BACKGROUND

1. Field

The present invention relates generally to communication, and more specifically to techniques for supporting handoff of a terminal between base stations of different protocol revisions in a code division multiple access (CDMA) communication system.

2. Background

Wireless communication systems are widely deployed to provide various types of communication such as voice, packet data, and so on. These systems may be multiple-access systems capable of supporting communication with multiple users, and may be based on code division multiple access (CDMA), time division multiple access (TDMA), frequency division multiple access (FDMA), or some other multiple access techniques. CDMA systems may provide certain advantages over other types of system, including increased system capacity.

A CDMA system is typically designed to conform to one or more CDMA standards. Examples of such CDMA standards include "TIA/EIA/IS-95-A Mobile Station-Base Station Compatibility Standard for Dual-Mode Wideband Spread Spectrum Cellular System" (hereinafter, the IS-95A standard), "TIA/EIA/IS-95-B Mobile Station-Base Station Compatibility Standard for Dual-Mode Wideband Spread Spectrum Cellular System" (hereinafter, the IS-95B standard), and TIA/EIA/IS-2000 (hereinafter, the IS-2000 standard). Each CDMA standard may also be associated with multiple releases, each of which may include upgrades and new features for that standard. For example, the IS-2000 standard includes a Release 0, Release A, Release B, Release C, and so on. New CDMA standards and releases are continually proposed and adopted for use.

The IS-95A standard, which covers first generation CDMA, is designed mainly for voice communication. As such, it supports one call between a terminal and a base station at any given moment. The IS-95B standard, which covers next generation CDMA, supports voice and data communication (albeit at a relatively low data rate). The IS-2000 standard supports both voice and high-speed data communication. For the standard family comprised of IS-95 and IS-2000, each newer CDMA standard and release within that family incorporates the features and functionality defined in prior CDMA standards and releases, and further adds improvements and/or new features.

A CDMA standard/release may be assigned a specific signaling protocol revision level (P_REV) that may be used to unambiguously identify that standard/release. For example, on the base station side, IS-95B, IS-2000 Release 0, and IS-2000 Release A are associated with P_REVs of 5, 6, and 7, respectively. A new release of a given standard may thus be viewed as another standard. In general, a newer CDMA standard is backward compatible with older CDMA standards. A terminal or a base station designed to support a particular P_REV (e.g., P_REV=7) would then be able to support lower P_REVs (e.g., P_REVs=5 and 6) as well.

A wireless service provider may, due to different deployment options available, deploy different generations of base stations near or next to each other. This may result in compatibility issues if base stations with different P_REVs are used to support communication for a given terminal. For such a hybrid deployment, a terminal may be in communication with one base station of a particular P_REV and thereafter be handed off to another base station of a different P_REV. A higher P_REV is generally associated with more parameters since it supports more features and functions than a lower P_REV. Thus, if the terminal is handed off between base stations of different P_REVs, there are challenges associated with handling parameters that are defined in one P_REV and not in another P_REV.

There is therefore a need in the art for techniques to support handoff of a terminal between base stations of different protocol revisions that may be associated with different parameters used for communication.

SUMMARY

Techniques are provided herein to support a handoff of a terminal between base stations of different protocol revisions. Various schemes are described herein for supporting the handoff. The particular scheme to use for the handoff depends on the protocol revisions of the terminal and the target base station and possibly other factors (e.g., whether or not there is a dormant call).

In one embodiment, a method is provided for supporting handoff of a terminal between base stations of different protocol revisions in a CDMA communication system. In accordance with the method, a handoff of the terminal from a first base station to a second base station is performed while the terminal is in an active (data or voice) call with the first base station. The first base station supports a first protocol revision (e.g., P_REV$\leq$5) and the second base station supports a second protocol revision (e.g., P_REV$\geq$6) that is later than the first protocol revision. The active call may be maintained between the terminal and the second base station using a first service configuration previously established via the first base station for the active call.

A second service configuration may be established via the second base station for the active call. The second base station may query the terminal for the second service configuration or may simply assign the second service configuration. This query or assignment may be performed after the second base station has been added to the terminal's active set or after the handoff. Alternatively, the terminal may initiate the establishment of the second service configuration upon being informed (e.g., by a release of the active call or via a signaling message) that it can upgrade its service. The second service configuration may also be for a dormant call (if any) that has been established prior to the handoff. In any case, the active call may then be maintained using the second service configuration if it is available.

Each service configuration comprises a particular service option instance to be used for an associated call. The first service configuration may comprise a first service option instance for a low-speed packet data call (e.g., SO 7), and the second service configuration may comprise a second service option instance for a high-speed packet data call (e.g., SO 33).

Various aspects and embodiments of the invention are described in further detail below. The invention further provides other methods, program codes, digital signal processors, terminals, base stations, systems, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
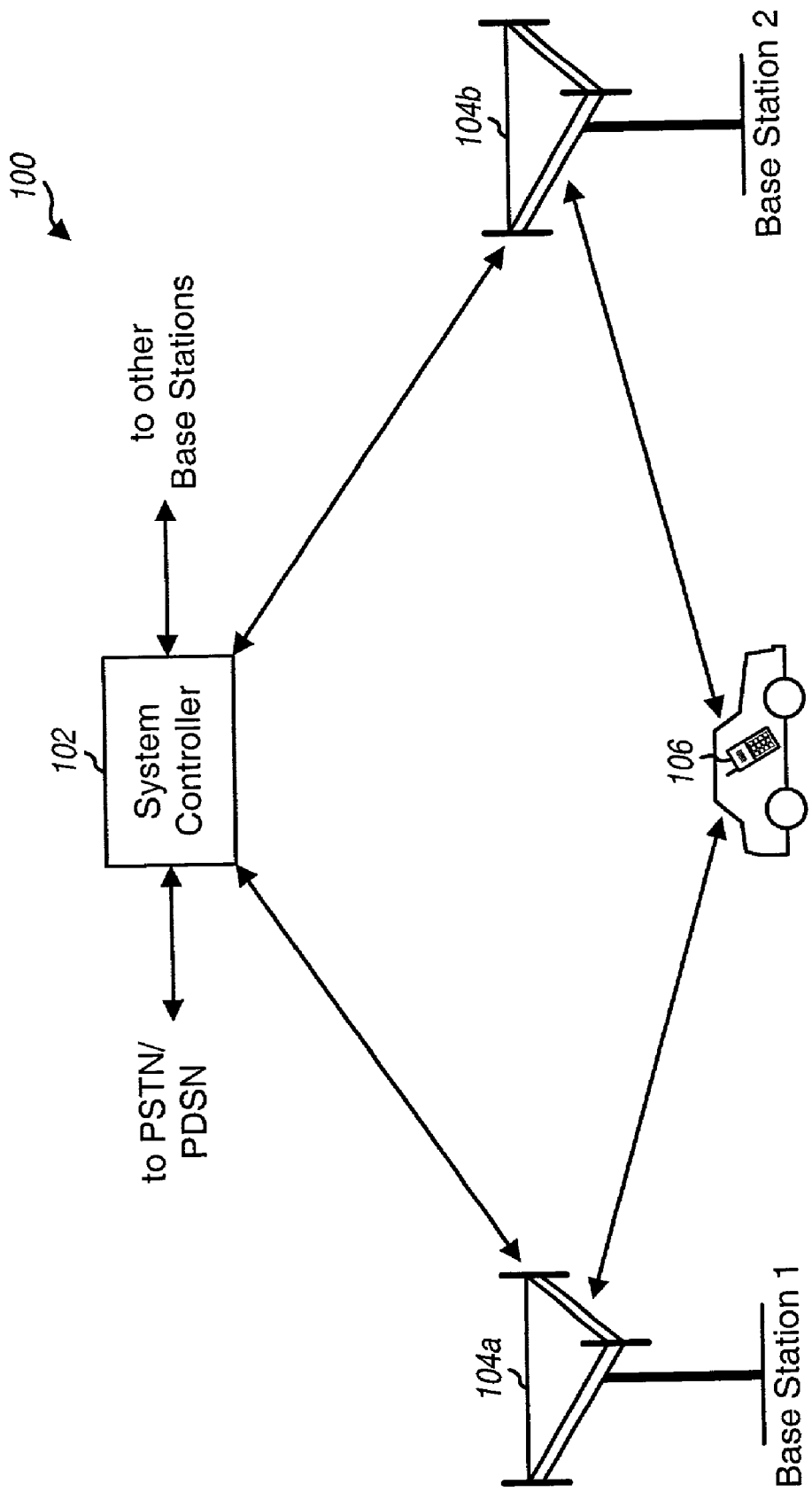
FIG. 1 is a diagram of a CDMA communication system wherein various aspects and embodiments of the invention may be implemented.

FIG. 1 is a diagram of a CDMA communication system 100 wherein various aspects and embodiments of the invention may be implemented. System 100 provides communication for a number of cells, with each cell being serviced by a corresponding base station 104. Various terminals 106 are dispersed throughout the system (only one terminal is shown in FIG. 1 for simplicity). Each terminal may communicate with one or more base stations 104 on the forward and reverse links at any given moment, depending on whether or not the terminal is active and whether or not it is in soft handoff. The forward link (i.e., downlink) refers to transmission from the base station to the terminal, and the reverse link (i.e., uplink) refers to transmission from the terminal to the base station.

System 100 may be designed to support one or more CDMA standards and releases such as IS-95A, IS-95B, IS-2000 Release 0, IS-2000 Release A, and so on. For simplicity, each release of a given standard may also be viewed as a standard. All of these standards are known in the art and incorporated herein by reference. On the base station side, the various CDMA standards are associated with different signaling protocol revision levels (P_REVs). And on the terminal side, the various CDMA standards are associated with different mobile signaling protocol revision levels (MOB_P_REVs). In particular, IS-95B, IS-2000 Release 0, and IS-2000 Release A are respectively associated with P_REVs of 5, 6, and 7 on the base station side, and respectively associated with MOB_P_REVs of 4/5, 6, and 7 on the terminal side. The base station P_REVs and terminal MOB_P_REVs do not map directly for all CDMA standards.

A newer CDMA standard is generally backward compatible with older CDMA standards. Thus, a terminal or a base station designed to support a particular P_REV (e.g., P_REV=7) would also be able to support lower P_REVs (e.g., P_REVs=5 and 6) as well.

Figure 2A:
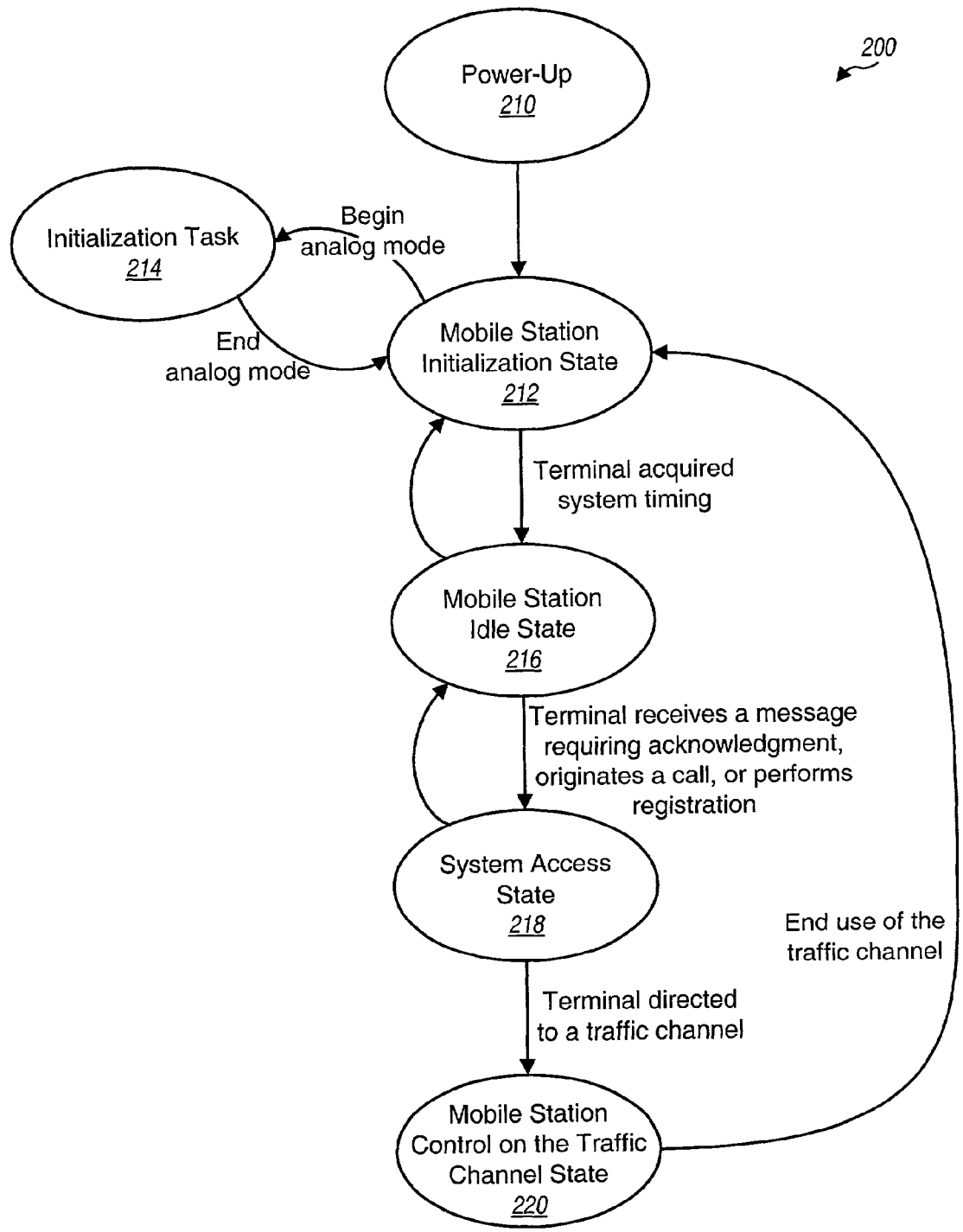
FIGS. 2A-2B are state machines for call processing at a terminal, as defined by IS-2000.

FIG. 2A is a state machine 200 for call processing at a terminal, as defined by IS-2000. Upon power-up, the terminal transitions from a Power-Up State 210 to a Mobile Station Initialization State 212.

In state 212, the terminal selects a particular system to use. If an analog system is selected, then the terminal transitions to a state 214 and begins analog mode operation. Otherwise, if a CDMA system is selected, then the terminal proceeds to acquire and synchronize to the selected CDMA system. Upon acquiring the timing of the selected CDMA system, the terminal enters a Mobile Station Idle State 216.

In state 216, the terminal is "ON" but not active. The terminal monitors a paging channel for messages from a base station in an active set. The active set is a list of one or more base stations with which the terminal currently communicates. If the terminal is unable to receive the paging channel or if a new base station is to be added to an active set of the terminal, then the terminal returns to state 212 and acquires the new base station. In state 216, the terminal can receive messages or an incoming call, originate a call, perform registration, transmit a message, or perform some other actions. Upon initiating any of these actions, the terminal transitions to a System Access State 218.

In state 218, the terminal sends messages on one or more access channels to the base station in the active set and receives messages from the base station on the paging channel in an attempt to access the base station. Depending on the outcome of the message exchange, the terminal may either return to Idle State 216 if there is no active communication or proceed to a Mobile Station Control on the Traffic Channel State 220 if a call is to be processed. Before transitioning to state 220, the terminal is assigned a forward traffic channel for the call.

In state 220, the terminal communicates with the base station using the established forward and reverse traffic channels. Upon termination of the last call, the traffic channel is released and the terminal returns to state 212.

Each of the states shown in FIG. 2A is defined by a respective state machine that includes a number of substates.

Figure 2B:
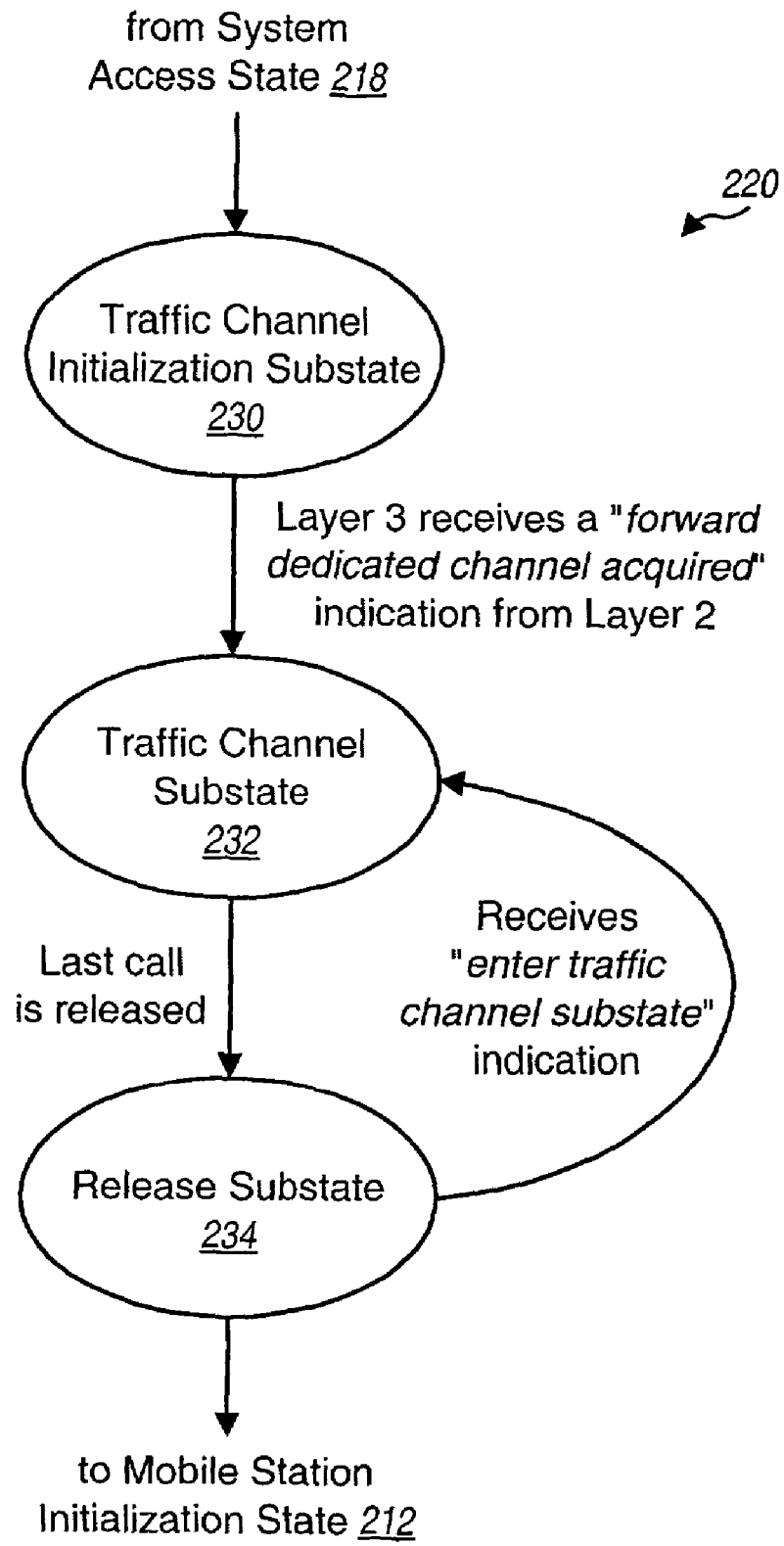

FIG. 2B is a state machine for Mobile Station Control on the Traffic Channel State 220, as defined by IS-2000. From System Access State 218, upon receiving the assigned forward traffic channel, the terminal enters a Traffic Channel Initialization Substate 230 of state 220.

In substate 230, the terminal verifies that it can receive data on the forward traffic channel, begins transmitting data on the reverse traffic channel, and synchronizes the traffic channels between the terminal and the base station. The terminal then waits for an indication from layer 2 that the forward traffic channel has been acquired. Upon receiving this indication, the terminal transitions to a Traffic Channel Substate 232.

In substate 232, the terminal exchanges traffic channel frames with the base station in accordance with the current service configuration. While in substate 232, one or more Call Control (CC) instances (or calls) can be activated (described below). The terminal remains in substate 232 if any call is active. Upon releasing the last call (either by the terminal user or via a Release Order Message or an Extended Release Message from the base station), the terminal transitions to a Release Substate 234.

In substate 234, the terminal disconnects the calls and the physical channels. The terminal then returns to Traffic Channel Substate 232 if it receives an indication to enter this substate or otherwise transitions back to Mobile Station Initialization State 212.

The state machines shown in FIGS. 2A and 2B are described in further detail in an IS-2000 standard document TIA/EIA/IS-2000-5, entitled "Upper Layer (Layer3) Signaling Standard for CDMA 2000 Spread Spectrum Systems," March 2000, which is incorporated herein by reference. Similar state machines are defined by other CDMA standards (e.g., IS-95B) for the terminal call processing.

Figure 3:
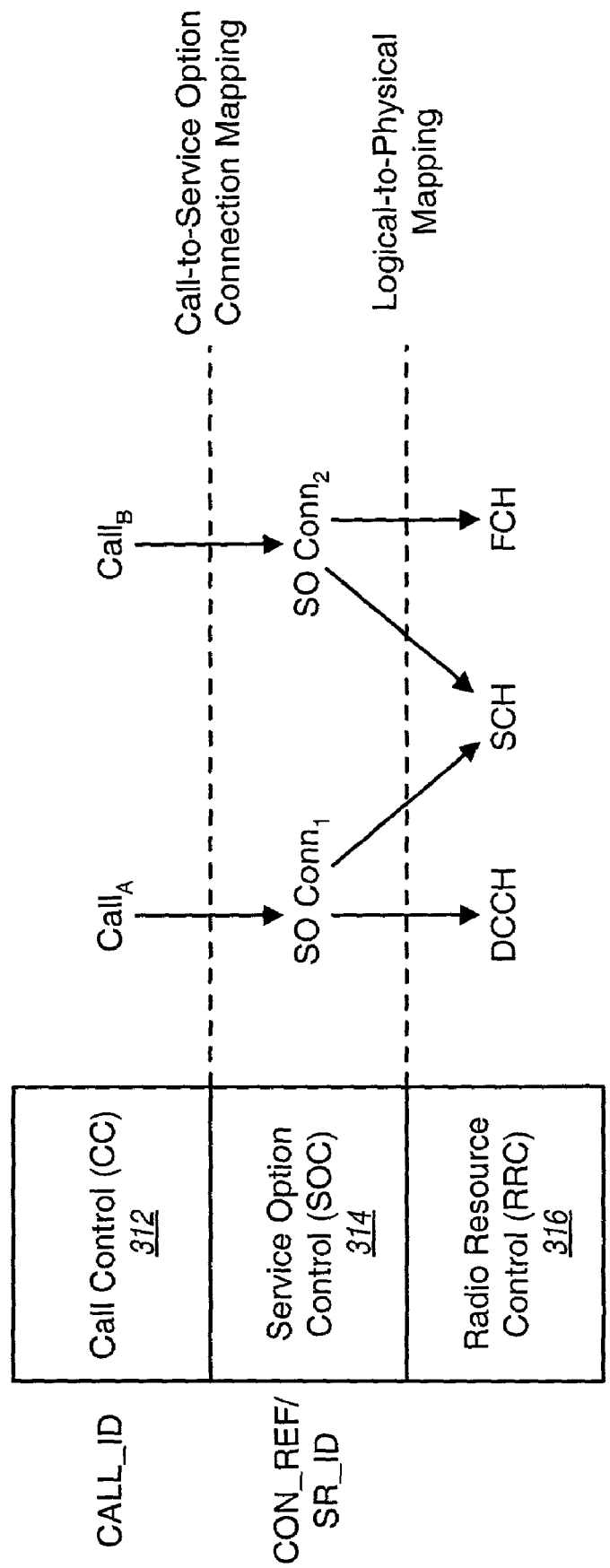
FIG. 3 is a diagram illustrating the mapping between some of the sublayers of a layer-3 defined by IS-2000.

FIG. 3 is a diagram illustrating the mapping between some of the sublayers of a layer-3 defined by IS-2000. Layer-3 handles call processing and service configuration. As shown in FIG. 3, layer-3 includes a call control (CC) sublayer 312 that resides on top of a service option control (SOC) sublayer 314 that further resides on top of a radio resource control (RRC) sublayer 316. RRC sublayer 316 defines the physical traffic channels available for data transmissions. SOC sublayer 314 defines a set of parameters to be used for communication such as multiplex options, power control, forward link traffic channel characteristics, and so on. Call control sublayer 312 identifies a set of pending calls being processed.

The following terminology is used herein:

Service option (SO)—A service capability of the system. Service options may be applications such as voice, data, facsimile, and so on.

Service option connection (SO Conn)—A particular instance or session in which the service defined by a particular service option is used. A service option connection is associated with (1) a reference (CON_REF), which is used to uniquely identify the service option connection, (2) a service option, which specifies the particular type of service in use, (3) a forward traffic channel traffic type, which specifies what type of forward traffic channel traffic is used to support the service option connection, and (4) a reverse traffic channel traffic type, which specifies what type of reverse traffic channel traffic is used by the service option connection.

Service configuration—The common attributes used by a terminal and a base station for communication (i.e., to build and interpret traffic channel frames exchanged between the terminal and base station). This set of attributes comprises negotiable and non-negotiable parameters.

Service configuration record (SCR)—The record used to send information for negotiable parameters, which include (1) forward and reverse multiplex options, (2) forward and reverse traffic channel configurations, (3) forward and reverse traffic channel transmission rates, and (4) service option connections. Each SCR can include one or more service option connection records, and each service option connection record is associated with a service reference identifier (SR_ID).

Non-negotiable service configuration record (NNSCR)—The record used to send information for non-negotiable parameters.

Service reference identifier (SR_ID). The SR_ID identifies an associated service option instance.

A call is used to loosely describe a communication session of a certain type of service (indicated by service option number) between a terminal and the CDMA system. For IS-2000, there is a one-to-one mapping between each call and an associated service option connection. Each call is thus also associated with a particular service option (SO), which formally defines the manner in which data bits are processed by the terminal and base station for that call. As examples, SO 7 is a service option for a low-speed packet data call in P_REV=5, and SO 33 is a service option for a high-speed packet data call in P_REVs≧6.

For IS-2000 Release A (i.e., P_REV=7), a number of calls may be concurrently processed. As each call is connected, a new call control (CC) state machine (denoted as $Call_X$) is instantiated. The instantiated CC state machine is of a type which is selected based on the type of call being processed (e.g., voice, data, and so on). IS-2000 Release A supports a number of different CC state machine types.

In the example shown in FIG. 3, each call ($Call_X$) is processed in CC sublayer 312 and mapped to a particular service option connection (SO $Conn_N$). In the example shown in FIG. 3, $Call_A$ is mapped to SO $Conn_1$ and $Call_B$ is mapped to SO $Conn_2$. The subscripts A and B represent the call identifiers (CALL_IDs) used to identify the calls, and the subscripts 1 and 2 represent the references (CON_REFs) for the established service option connections. In the example shown in FIG. 3, SO $Conn_1$ is mapped to (i.e., utilizes) a dedicated control channel (DCCH) and a supplemental channel (SCH), and SO $Conn_2$ is mapped to a fundamental channel (FCH) and a supplemental channel.

When the call mapped to a particular service option connection is released, that service option connection may also be released. Similarly, when the last service option connection mapped to a particular physical channel is released, that physical channel may be released.

Each CDMA standard defines the procedures for performing service configuration and negotiation to set up various parameters used for communication between the terminal and base station. As noted above, the service configuration comprises both negotiable and non-negotiable parameters. During negotiation and/or confirmation, the information for negotiable parameters may be sent in a service configuration record (SCR) included in an appropriate signaling message, and the information for non-negotiable parameters may be sent in a non-negotiable service configuration record (NNSCR).

Service option connections may be negotiated between the terminal and base station via "service negotiation" procedures. If a service option connection is required to support a new call, then service option request and assignment are accomplished using the service negotiation procedures. The service negotiation procedures are described in detail by IS-2000.

Service options may also be negotiated between the terminal and base station, or default service options may also be selected for use. The service option negotiation procedures are also described in detail by IS-2000 and IS-95.

The service negotiation and service option negotiation are performed via an exchange of signaling messages between the terminal and base station. For IS-2000, the following signaling messages are sent by the base station via a forward dedicated signaling logical channel (f-dsch):

Service Connect Message (SCM): The base station can use this message to (1) accept a service configuration proposed by the terminal, (2) instruct the terminal to begin using the service configuration included in the message, or (3) instruct the terminal to use a particular stored service configuration.

Universal Handoff Direction Message (UHDM): The base station can use this message to (1) indicate whether service negotiation or service option negotiation is to be performed following a CDMA-to-CDMA hard handoff, (2) accept a service configuration proposed by the terminal, or (3) instruct the terminal to begin using the service configuration included in the message.

Status Request Message (SRQM): The base station can use this message to request the current service configuration from the terminal.

In-Traffic System Parameters Message (ITSPM): The base station can send this message to inform the terminal that the packet zone has changed (described below).

Release Order Message: The base station can use this message to release an active call.

Extended System Parameters Message (ESPM): The base station can also send this message to inform the terminal that the packet zone has changed.

For IS-2000, the following signaling messages are sent by the terminal via either a reverse dedicated signaling logical channel (r-dsch) or a reverse common signaling logical channel (r-csch):

Origination Message (ORM): The terminal can use this message to originate a new call.

Enhanced Origination Message (EOM): The terminal can also use this message to originate a new call.

Status Response Message (STRPM): The terminal can send this message to provide the current service configuration to the base station.

The above signaling messages are described in detail in the IS-2000 standard.

Table 1 lists some of the main features supported by P_REVs=5, 6, and 7 for calls.

TABLE 1

P_REV = 5
Support one data call and/or one voice call at any given moment.
P_REV = 6
Introduce the concept of service reference identifier (SR_ID) to identify each service option instance.
Introduce the concept of call dormancy whereby a traffic channel may be released for a data call but the SR_ID and PPP session information are retained during dormancy so that the data call can be quickly resumed at a later time.
Support one active data call at any given moment.
P_REV = 7
Introduce the concept of concurrent services whereby multiple calls may be concurrently supported, with each call being uniquely identified by its associated SR_ID.
Each dormant data call is also associated with an SR_ID.

A wireless service provider may deploy different generations of base stations with different P_REVs near or next to each other. This may result in compatibility issues if base stations with different P_REVs are designated to provide communication for a given terminal. For such a hybrid deployment, the terminal may be in communication with one base station of a particular P_REV and thereafter be handed off to another base station with a different P_REV. The base station with the higher P_REV supports more features and functions for calls, as shown in Table 1, and is generally associated with more parameters used to define communication. Thus, if the terminal is handed off between base stations of different P_REVs, then there are challenges associated with handling parameters (e.g., SR_ID) that are defined in one P_REV (P_REV≧6) and not in another P_REV (P_REV≦5).

The various compatibility scenarios may be briefly described with reference to FIG. 1. In FIG. 1, base station 1 may be associated with P_REV≦5 while base station 2 may be associated with P_REV≧6. If the terminal is associated with a MOB_P_REV of 5 and is handed off from base station 1 to base station 2, then base station 2 would need to operate at P_REV_IN_USE=5 for the communication with the terminal, and no incompatibility would be encountered. However, if the terminal is associated with MOB_P_REV≧6 and is handed off from base station 1 (with P_REV≦5) to base station 2 (with P_REV≧6), then there may be ambiguity regarding the use of SR_ID, which is defined in P_REV≧6 but not in P_REV≦5, for the active and dormant calls. These various scenarios are described in further detail in the following figures.

For simplicity, P_REVs of 5, 6, and 7 are specifically described in the following figures. However, the techniques described herein for supporting handoffs may be extended to cover other P_REVs and this is within the scope of the invention. In the following figures, base station 1 may be associated with P_REV≦5 in FIGS. 4A-4H, and base station 2 is associated with P_REV=6 in FIGS. 4A-4B and 4G and with P_REV≧7 in FIGS. 4C-4F and 4H.

For clarity in the following figures, specific service options SO 7 and SO 33 (which are defined in IS-707) are described. Other service options are also applicable and may be used for data calls. For example, SO 7 or some other low-speed packet data service option may be used for a data call with a base station with P_REV≦5, and SO 33 or some other high-speed packet data service option may be used for a data call with a base station with P_REV≧6.

Figure 4A:
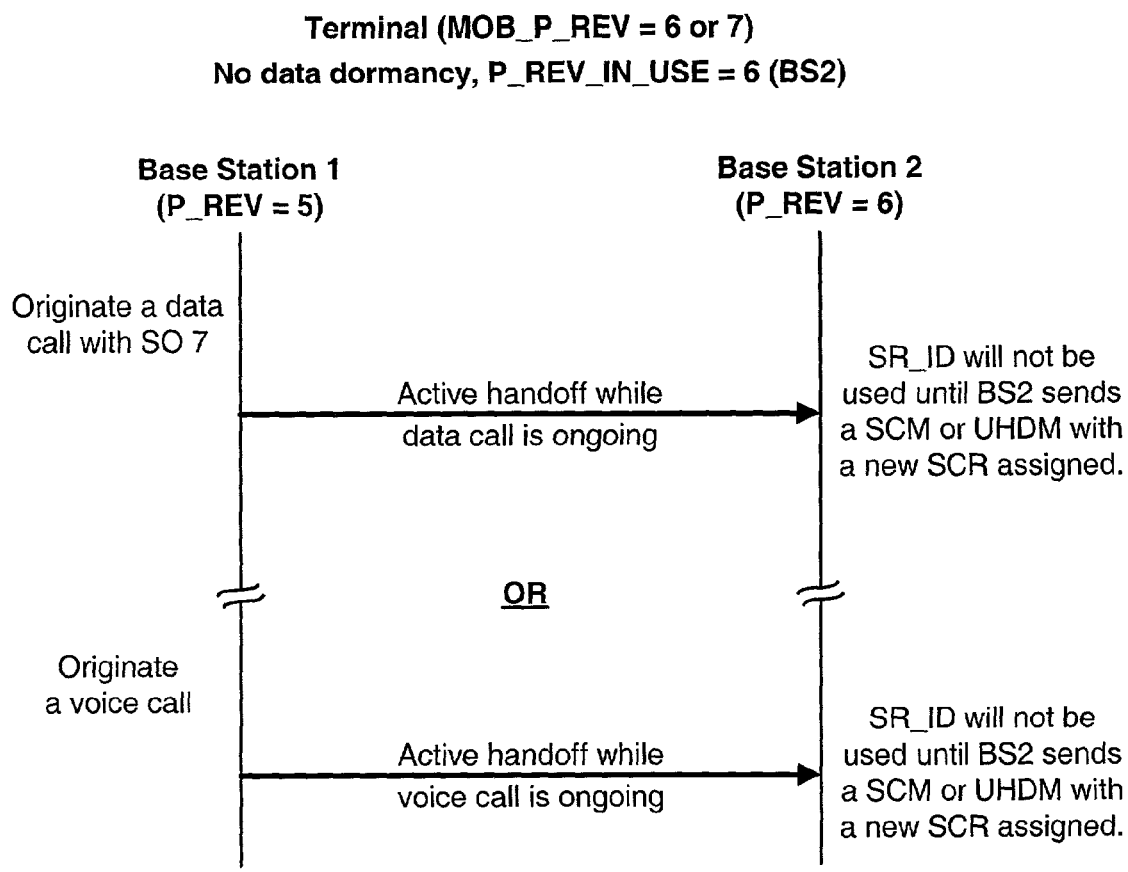
FIGS. 4A-4H are diagrams illustrating a handoff of a terminal (with a particular MOB_P_REV) from base station 1 (with P_REV=5) to base station 2 (with a particular P_REV greater than 5) for various operating scenarios.

FIG. 4A is a diagram illustrating a handoff of a terminal (with MOB_P_REV=6 or 7) from base station 1 (with P_REV=5) to base station 2 (with P_REV=6). For FIG. 4A, there are no dormant data calls (i.e., no data dormancy) when the handoff occurred, and the P_REV_IN_USE=6 after the handoff. For compatibility reasons, the P_REV_IN_USE is dictated by the lower of (1) the P_REV of the target base station and (2) the MOB_P_REV of the terminal (i.e., P_REV_IN_USE=min {P_REV, MOB_P_REV}). Two scenarios are shown in FIG. 4A, one for a handoff with an active data call and another for a handoff with an active voice call.

In the first scenario, the terminal initially originates a data call with base station 1. Since base station 1 is associated with P_REV=5, this data call may be for SO 7, which is a service option for a low-speed packet data call. While the data call is still active, the terminal is handed off from base station 1 to base station 2. Since the P_REV_IN_USE=6 after the handoff, this data call may be associated with an SR_ID. However, since only one call has been established thus far, there is no ambiguity at both the terminal and base station 2 as to which call is being processed. Thus, an SR_ID) may be omitted (i.e., not used) for this data call. If an SR_ID is to be used for the data call, then base station 2 can send the SR_ID for this call in a service configuration record (SCR) included in a Service Connect Message or a Universal Handoff Direction Message (SCM/UHDM) sent to the terminal. Both the terminal and base station 2 would thereafter use this SR_ID for the data call.

In the second scenario, the terminal initially originates a voice call with base station 1. This voice call may be for Multiplex Option=1 and Radio Configuration (RC)=1, which are defined in IS-95 and IS-2000. While the voice call is still active, the terminal is handed off to base station 2. Since the P_REV_IN_USE=6 after the handoff, this voice call may be identified by an SR_ID. Again, since only one call has been established thus far, there is no ambiguity at both the terminal and base station 2, and the SR_ID may be omitted. However, if an SR_ID is to be used for this voice call, then base station 2 can send the SR_ID in an SCR included in an SCM/UHDM. Both the terminal and base station 2 would thereafter use this SR_ID for the voice call.

In one embodiment, for both scenarios described above, the target base station 2 sends to the terminal an SCM/UHDM with the new service configuration records (e.g., new SCR and NNSCR, including the SR_ID) after the base station is added to the active set. The message may be sent prior to or during the handoff. For this embodiment, the terminal can store the service configuration records for use thereafter.

In another embodiment, for both scenarios described above, the target base station 2 sends to the terminal an SCM/UHDM with the new service configuration records after the handoff. For this embodiment, the SCM/UHDM may be sent only if service configuration records are needed (e.g., if an SR_ID is to be used for the active call).

Figure 4B:
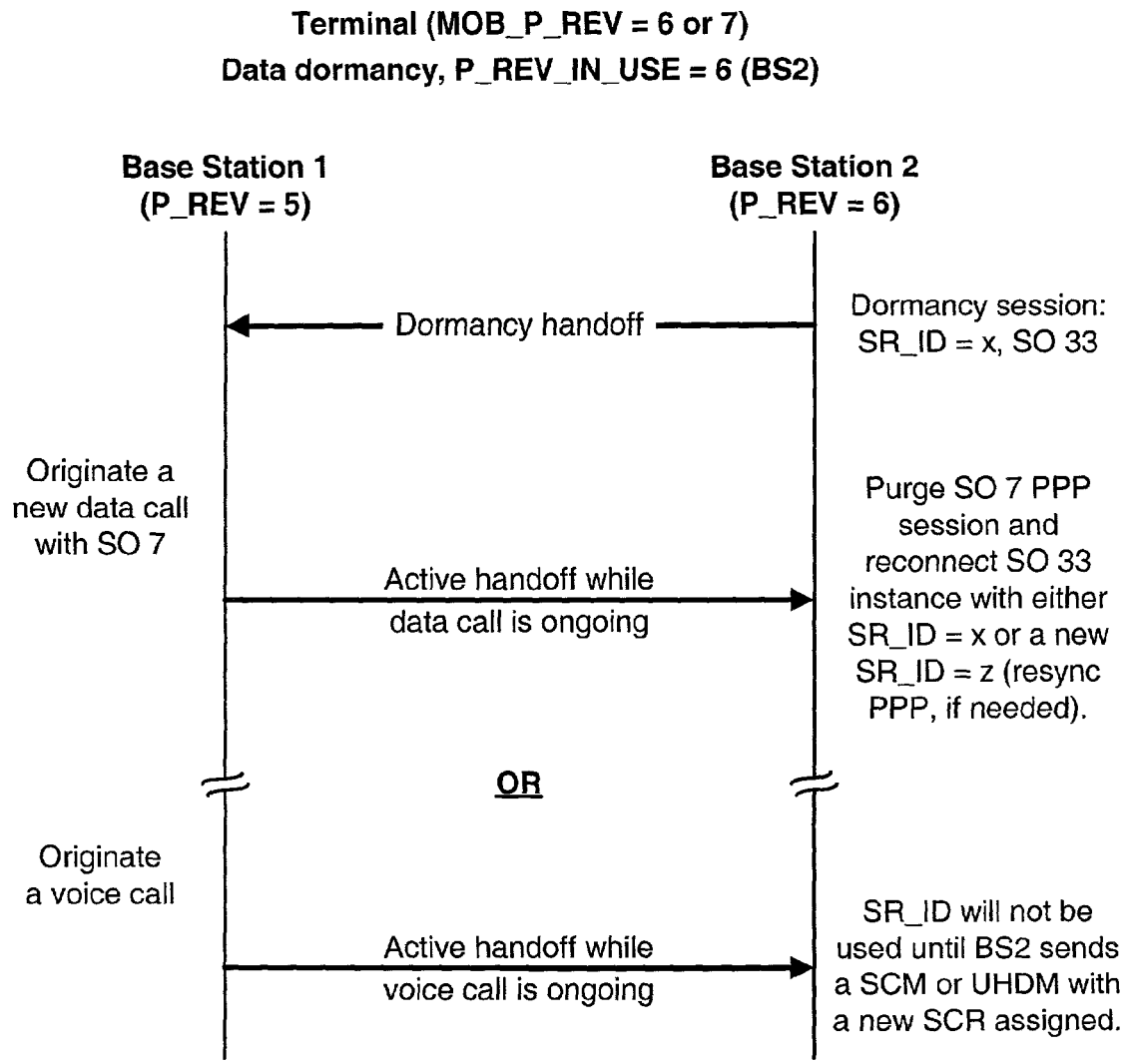

FIG. 4B is a diagram illustrating a handoff of a terminal (with MOB_P_REV=6 or 7) from base station 1 (with P_REV=5) to base station 2 (with P_REV=6), with data dormancy and P_REV IN USE=6 after the handoff. Again, two scenarios are shown in FIG. 4B, one for a handoff with an active data call and another for a handoff with an active voice call.

In the first scenario, the terminal initially establishes a data call with a base station (with P_REV=6 or 7), which may be base station 2 or another base station in the system. This data call may be for SO 33, which is a service option for a high-speed packet data call, and may be assigned SR_ID=x. Thereafter, this data call becomes dormant and the terminal is handed off to base station 1 during the dormancy.

For P_REV≧6, the terminal and base station establish a PPP session at the start of the first data call. This PPP session may be maintained even if the data call becomes dormant, which would then allow data communication to be more quickly resumed if the dormant call is thereafter reconnected or a new data call is established. The service configuration for dormant calls may or may not be retained by the terminal and the network side, depending on the terminal and system implementations.

The terminal thereafter originates a new data call with base station 1. Since base station 1 has P_REV=5, this new data call may be for SO 7. While this data call is still active, the terminal is handed off from base station 1 to base station 2. Since the P_REV_IN_USE=6 after the handoff, this active data call may be associated with an SR_ID.

In one embodiment, the SO 7 PPP session established for the active data call is purged and the dormant SO 33 instance is reconnected for the active data call. The reconnected SO 33 instance may be for SR_ID=x or a new SR_ID=z. The particular SR_ID to be used for the reconnected SO 33 instance may be determined based on various schemes. In a first scheme, base station 2 brings the dormant session (with SR_ID=x) out of dormancy. In a second scheme, base station 2 simply assigns a new SR_ID=z for the reconnected SO 33 instance. The SR_ID for the reconnected SO 33 instance (which may be the proposed SR_ID or the assigned SR_ID) may be sent to the terminal via an SCR in an SCM/UHDM. The SO 33 PPP session may also be resync, if necessary (e.g., if SR_ID=z is to be used for the reconnected SO 33 instance instead of SR_ID=x).

In the second scenario, the terminal initially establishes a data call with a base station (with P_REV=6 or 7) and is handed off to base station 1 when the data call is dormant. The terminal then originates a voice call with base station 1 and, while the voice call is still active, is handed off to base station 2. Since the P_REV_IN_USE=6 after the handoff, this voice call may be associated with an SR_ID. However, since there is only one (active) voice call and one (dormant) data call (i.e., one call of each type), there is no ambiguity at both the terminal and base station 2, and the SR ID may be omitted for the voice call. If an SR_ID is to be used for this voice call, then base station 2 can send the SR_ID via an SCR in an SCM/UHDM. Both the terminal and base station 2 would thereafter use this SR_ID for the voice call.

Figure 4C:
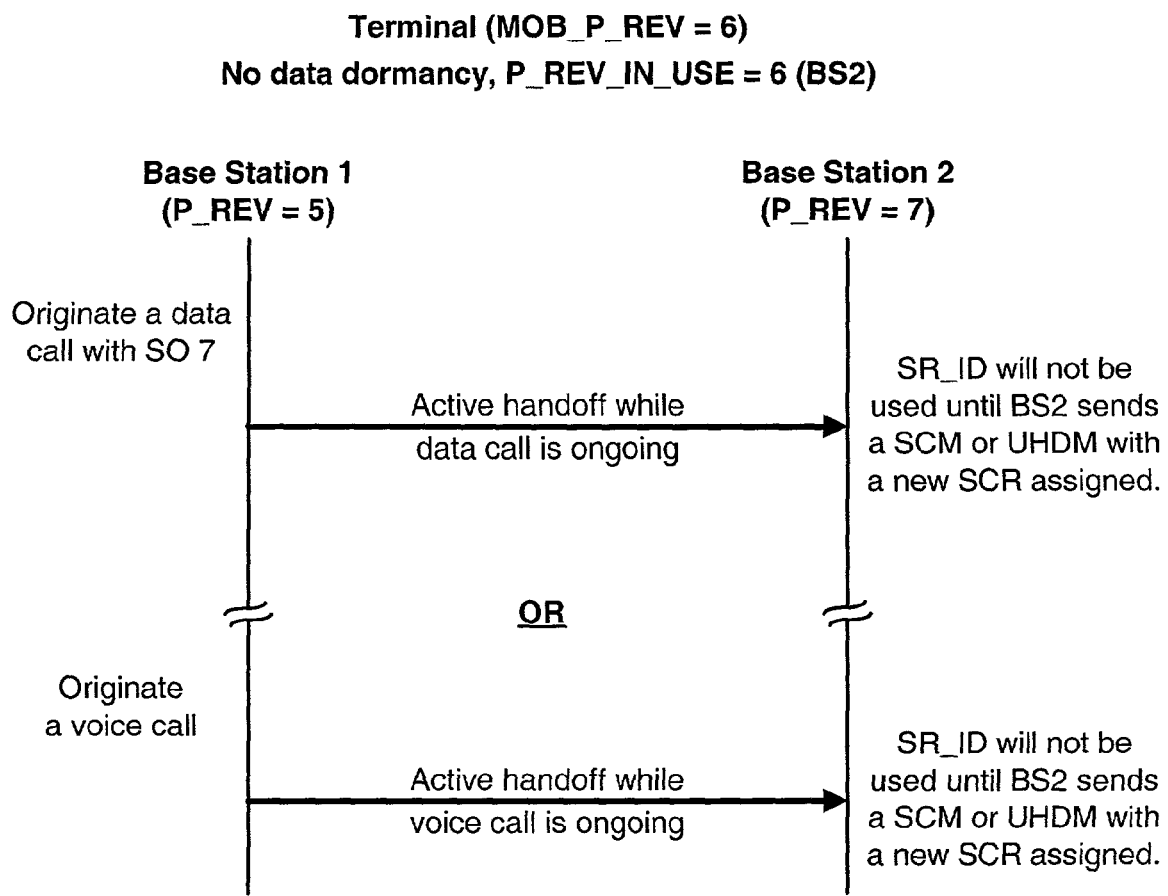

FIG. 4C is a diagram illustrating a handoff of a terminal (with MOB_P_REV=6) from base station 1 (with P_REV=5) to base station 2 (with P_REV=7), with no data dormancy and P_REV_IN_USE=6 after the handoff.

In the first scenario, the terminal initially originates a data call for SO 7 with base station 1 and, while the data call is still active, is handed off to base station 2. Even though base station 2 has P_REV=7, it needs to step down to P_REV=6 since the terminal has MOB_P_REV=6, and thus the P_REV_IN_USE=6. The active data call may then be handled in similar manner as that described above for FIG. 4A. In particular, an SR_ID may be omitted for this data call since there is only one call and no ambiguity exists at both the terminal and base station 2. However, if an SR_ID is to be used for the data call, then base station 2 can send the SR_ID via an SCR in an SCM/UHDM.

In the second scenario, the terminal originates a voice call with base station 1 and, while the voice call is still active, is handed off to base station 2. Again, base station 2 needs to step down to P_REV=6 (i.e., P_REV_IN_USE=6), and the voice call is handled in similar manner as that described above for FIG. 4A.

Figure 4D:
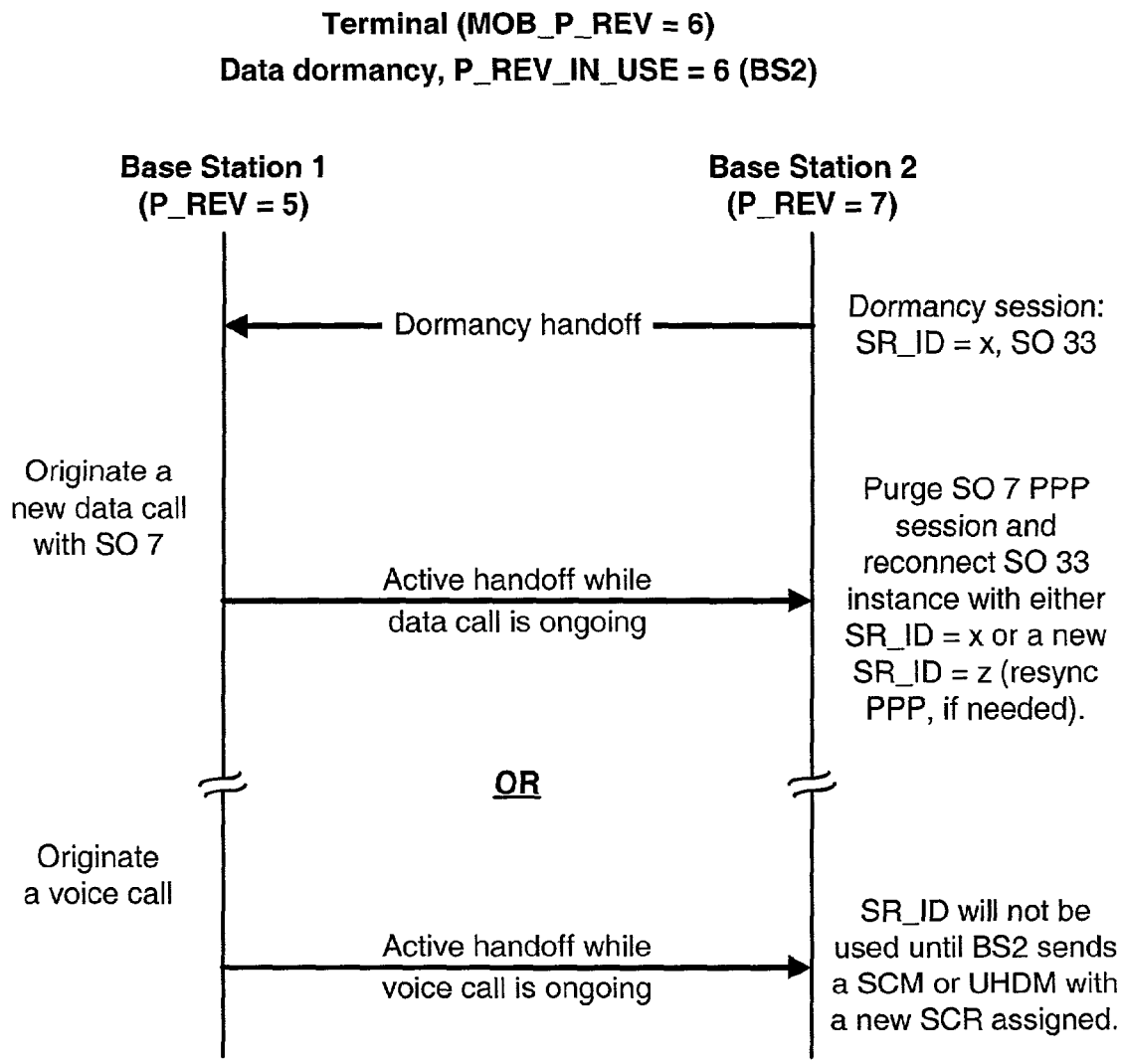

FIG. 4D is a diagram illustrating a handoff of a terminal (with MOB_P_REV=6) from base station 1 (with P_REV=5) to base station 2 (with P_REV=7), with data dormancy and P_REV_IN_USE=6 after the handoff.

In the first scenario, the terminal initially establishes a data call with a base station (with P_REV=6 or 7) for SO 33 and may be assigned SR_ID=x. Thereafter, this data call becomes dormant and the terminal is handed off to base station 1 during dormancy. The terminal thereafter originates a new data call for SO 7 with base station 1. While the SO 7 data call is still active, the terminal is handed off to base station 2. Since the P_REV_IN_USE=6 after the handoff, the active data call may be identified by an SR_ID. In one embodiment, the SO 7 PPP session is purged and the dormant SO 33 instance is reconnected with SR_ID=x or a new SR_ID=z assigned by base station 2. The SO 33 PPP session may also be resync, if necessary. In another embodiment, which is not shown in FIG. 4D, the dormant SO 33 session is purged (e.g., upon being handed off to base station 1) and the SO 7 PPP session for the active data call is maintained by base station 2 after the handoff. For this embodiment, the SR_ID may be omitted for the active data call (since there is only one data call and no ambiguity exists) or one may be assigned by base station 2 via an SCR in an SCM/UHDM.

In the second scenario, the terminal has a dormant SO 33 data call with SR_ID=x when it was handed off to base station 1. The terminal thereafter originates a voice call with base station 1 and, while the voice call is still active, is handed off to base station 2. Since the P_REV_IN_USE=6 after the handoff, this voice call may be associated with an SR_ID. However, since there is only one (active) voice call and one (dormant) data call, there is no ambiguity at both the terminal and base station 2, and the SR_ID may be omitted. If an SR_ID is to be used for the active voice call, then base station 2 can send the SR_ID via an SCR in an SCM/UHDM. Both the terminal and base station 2 would thereafter use this SR_ID for the voice call.

Figure 4E:
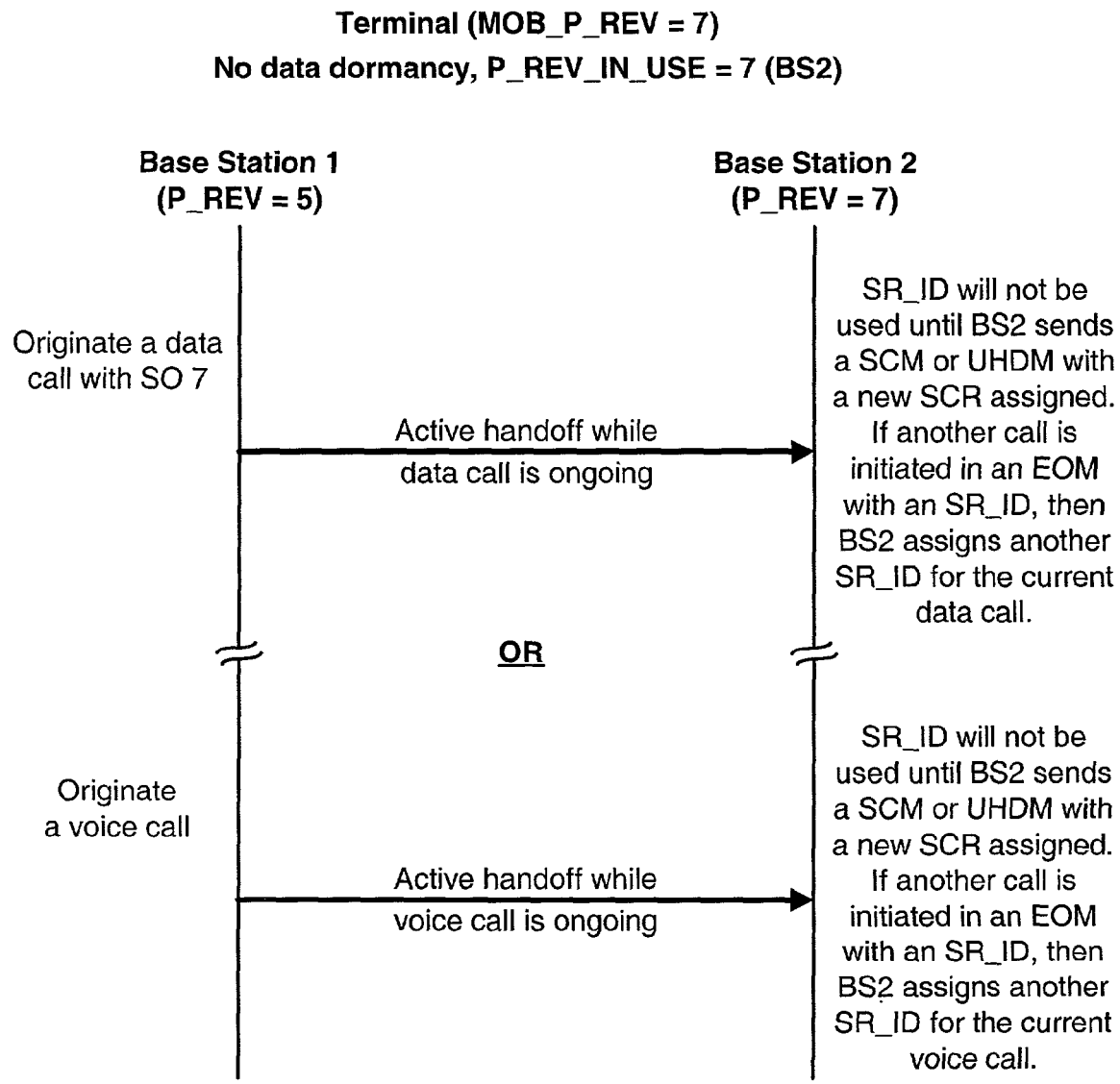

FIG. 4E is a diagram illustrating a handoff of a terminal (with MOB_P_REV=7) from base station 1 (with P_REV=5) to base station 2 (with P_REV=7), with no data dormancy and P_REV_IN_USE=7 after the handoff.

In the first scenario, the terminal initially originates a data call for SO 7 with base station 1 and, while the data call is still active, is handed off to base station 2. An SR_ID may be omitted for this data call since there is no ambiguity with only one pending data call. However, if an SR_ID is to be used for this data call, then base station 2 can send the SR_ID via an SCR in an SCM/UHDM.

Since P_REV=7 supports multiple concurrent calls, another (data or voice) call may be initiated by the terminal via an Enhanced Origination Message (EOM) with a proposed SR_ID for the new call. In that case, two different SR_IDs would be needed for the current data call and the new call. The SR_ID proposed by the terminal for the new call may be accepted by base station 2 and used for the new call. Base station 2 may then assign another SR_ID, if one has not already been assigned, for the current data call. Base station 2 then sends to the terminal both the proposed SR_ID for the new call and the assigned SR_ID for the current data call via an SCR in an SCM/UHDM.

In the second scenario, the terminal originates a voice call with base station 1 and, while the voice call is still active, is handed off to base station 2. Again, an SR_ID may be omitted for this voice call since there is currently only one call. However, if an SR_ID is to be used, then base station 2 can send the SR_ID via an SCR in an SCM/UHDM. Similar to the first scenario, if another call is initiated by the terminal via an Enhanced Origination Message with a proposed SR_ID for the new call, then base station 2 can accept the proposed SR_ID for the new call and assign another SR_ID for the current voice call. In this way, both calls can be associated with unique SR_IDs.

Figure 4F:
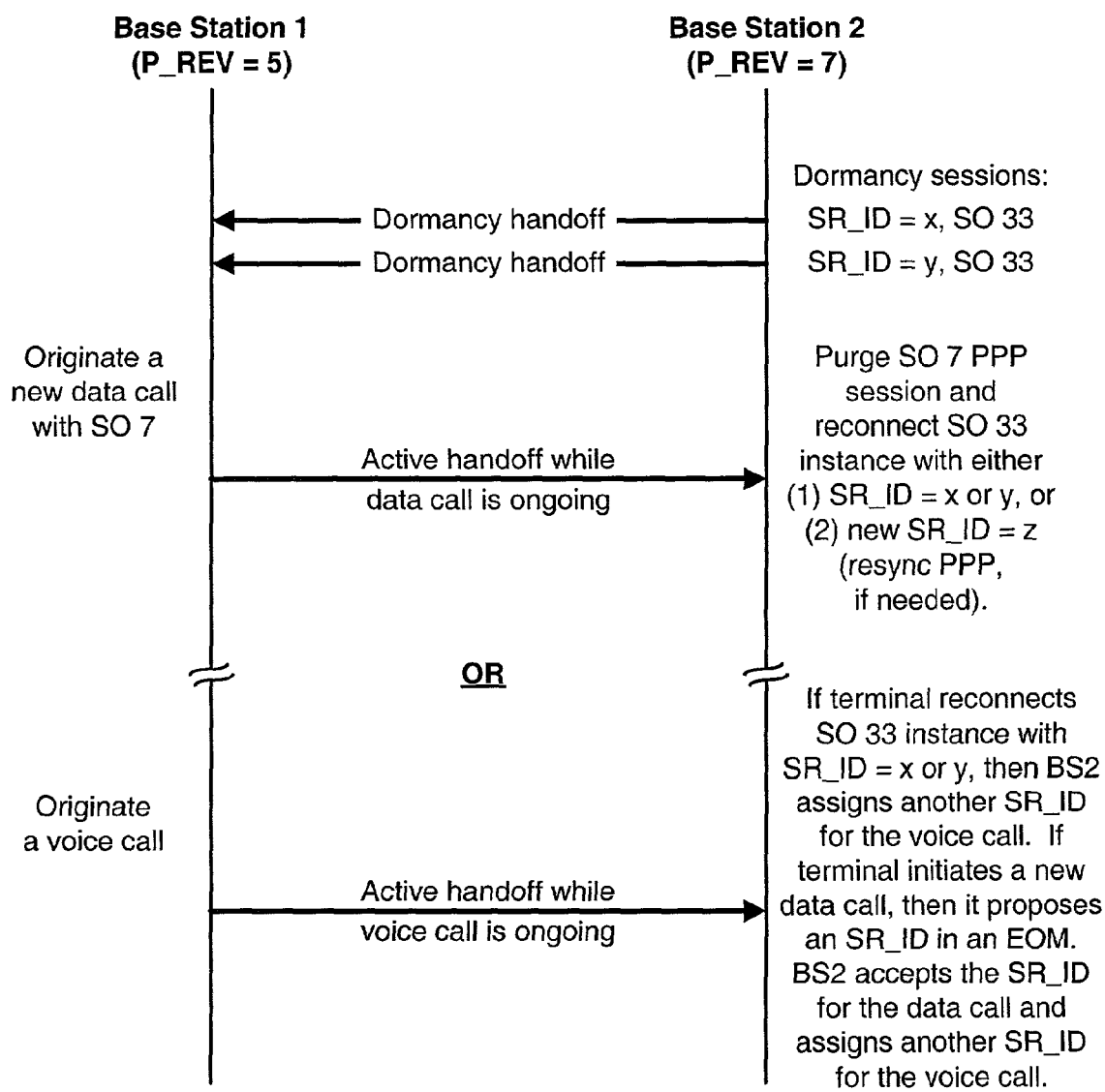

FIG. 4F is a diagram illustrating a handoff of a terminal (with MOB_P_REV=7) from base station 1 (with P_REV=5) to base station 2 (with P_REV=7), with data dormancy and P_REV_IN_USE=7 after the handoff.

In the first scenario, the terminal initially establishes two data calls with a base station (with P_REV=6 or 7), which may or may not be base station 2. These data calls may be for SO 33 and may be assigned SR_ID=x and SR_ID=y. In general, any number of data calls (from 2 to 7) may have been established. Thereafter, the data calls become dormant and the terminal is handed off to base station 1 during dormancy. The terminal thereafter originates a new data call for SO 7 with base station 1. While the SO 7 data call is still active, the terminal is handed off to base station 2. Since the P_REV_IN_USE=7 after the handoff, the current data call may be identified by an SR_ID.

In one embodiment, the SO 7 PPP session for the active data call is purged, and one of the two dormant SO 33 instances is reconnected for the active data call. Since there are multiple dormant SO 33 instances, the specific SO 33 instance to be reconnected may be determined based on several schemes. In one scheme, the terminal autonomously selects which SR_ID to use for the reconnected SO 33 instance. Base station 2 queries the terminal for the current service configuration via a Status Request Message. The terminal then responds to the query with a Status Response Message that includes an SCR with the proposed SR_ID for the SO 33 instance to be reconnected. If base station 2 accepts the proposed SR_ID, then it reconnects the corresponding SO 33 instance. In a second scheme, base station 2 simply assigns a new SR_ID=z for the reconnected SO 33 instance, without querying the terminal. For both schemes, the final decision as to which SR_ID to use is made by the base station and the terminal accepts the decision. The reconnected SO 33 instance may thus be for SR_ID=x or y or a new SR_ID=z. The SR_ID to be used for the reconnected SO 33 instance is then provided to the terminal via an SCR in an SCM/UHDM. The SO 33 PPP session may also be resync, if necessary (e.g., if SR_ID=z is to be used for the reconnected SO 33 instance instead of SR_ID=x or y).

In another embodiment, both dormant SO 33 instances are purged (e.g., when the terminal is handed off to base station 1), and the SO 7 PPP session is maintained for the active data call when the terminal is handed off to base station 2. For this embodiment, the SR_ID may be omitted (since there is currently only one data call) or a new SR_ID may be assigned by base station 2 via an SCR in an SCM/UHDM.

In the second scenario, the terminal initially establishes two data calls and, while the calls are dormant, is handed off to base station 1. The terminal thereafter originates a voice call with base station 1 and, while the voice call is still active, is handed off to base station 2. Again, an SR_ID may be omitted for this voice call since there is no ambiguity with only one voice call. However, if an SR_ID is to be used for the voice call, then base station 2 can send the SR_ID via an SCR in an SCM/UHDM.

The terminal may also initiate a new data call via an Enhanced Origination Message, and may propose an SR_ID for this data call. The proposed SR_ID may be an SR_ID for one of the dormant data calls (i.e., SR_ID=x or y) or another SR_ID (e.g., the smallest number that is unused and currently available for the SR_ID). The base station can accept the proposed SR_ID for the new data call and may assign another SR_ID for the current voice call. In this way, the new data call and current voice call are associated with unique SR_IDs.

Figure 4G:
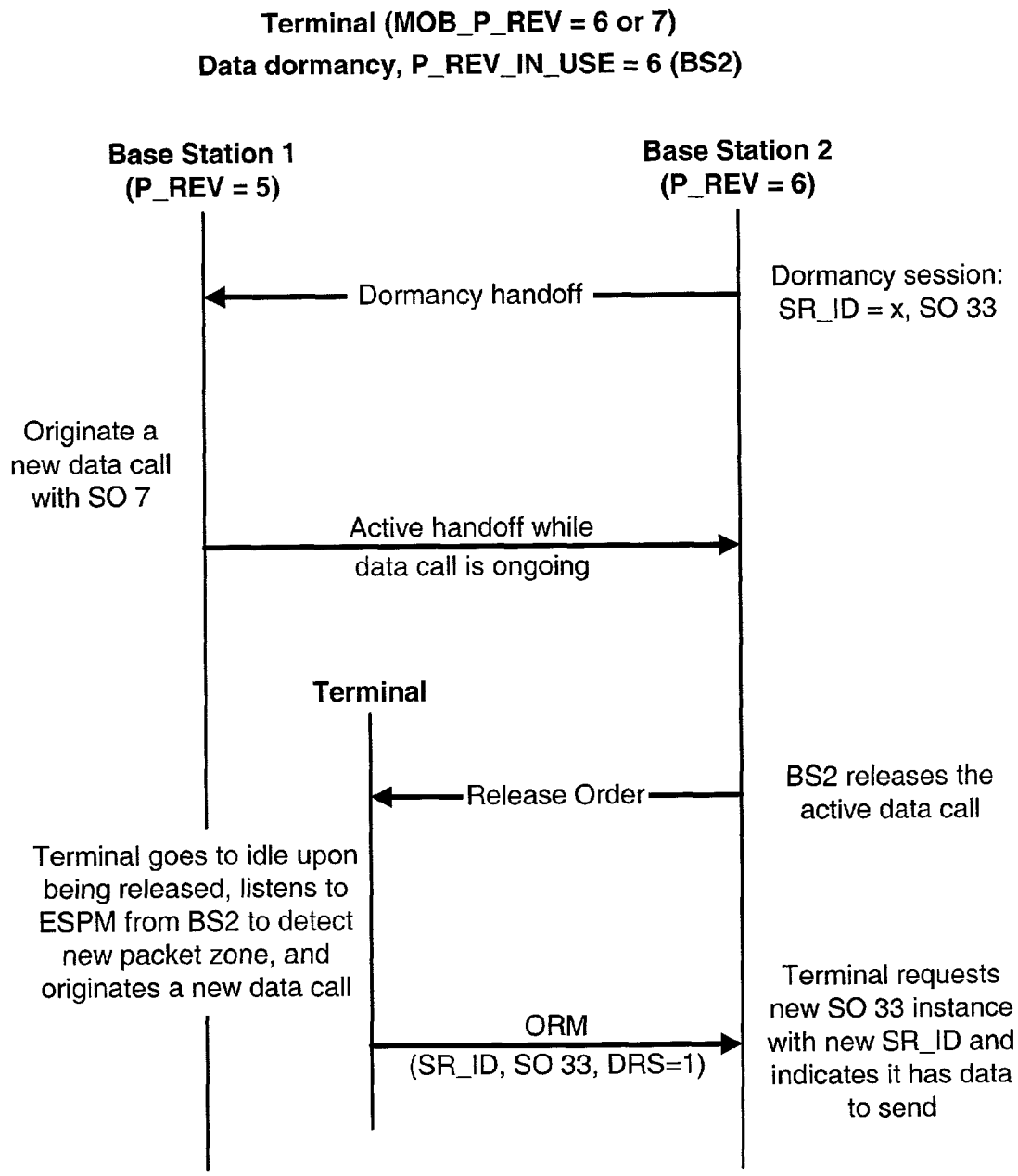

FIG. 4G is a diagram illustrating a handoff of a terminal (with MOB_P_REV=6 or 7) from base station 1 (with P_REV=5) to base station 2 (with P_REV=6), with data dormancy and P_REV_IN_USE=6 after the handoff. In this figure, the terminal initiates the use of a new SR_ID after the handoff to a base station with higher P_REV.

Initially, the terminal establishes a data call for SO 33 with a base station (with P_REV=6 or 7). Thereafter, the call becomes dormant and the terminal is handed off to base station 1 during dormancy. The terminal thereafter originates a new data call for SO 7 with base station 1. While this data call is still active, the terminal is handed off to base station 2. Since the P_REV_IN_USE=6 after the handoff, the active data call may be identified by an SR_ID.

After being handed off to base station 2, this base station releases the active data call (which is a non-SO 33 call) by sending a Release Order Message to the terminal. Upon receiving this message, the terminal enters an idle state and listens to an Extended System Parameters Message (ESPM) with Packet Zone ID (PZID) sent by base station 2. By processing the ESPM from base station 2, the terminal is able to detect that the packet zone has changed and that it may upgrade its service option. Each P_REV may be associated with a different packet zone, which is indicative of the service options available for that zone. When the terminal is handed off from a base station with P_REV=5 to a base station with P_REV≧6, the terminal may upgrade from SO 7 (low-speed packet data) to SO 33 (high-speed packet data). The terminal may then originate a new data call for SO 33 via an Origination Message (ORM) with a proposed SR_ID. A data ready (DRS) field in the ORM may be set to "1" to indicate that the terminal has data ready to be sent. Base station 2 may accept the request and a new SO 33 instance with the proposed SR_ID may be connected for the new data call.

FIG. 4G is also applicable for a handoff of a terminal (with MOB_P_REV=6) from base station 1 (with P_REV=5) to base station 2 (with P_REV=7). In this case, the P_REV_IN_USE=6 after the handoff.

Figure 4H:
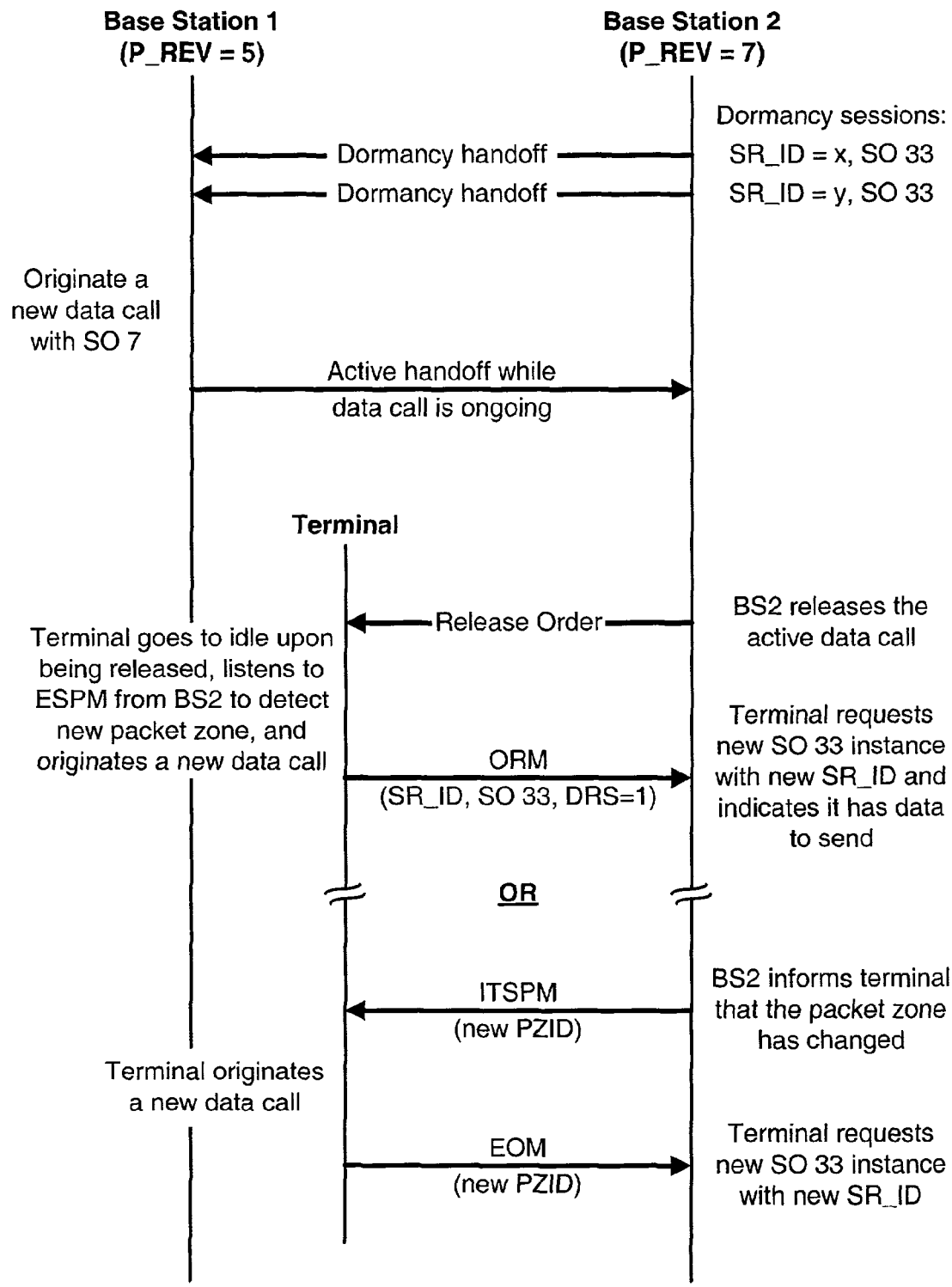

FIG. 4H is a diagram illustrating a handoff of a terminal (with MOB_P_REV=7) from base station 1 (with P_REV=5) to base station 2 (with P_REV=7), with data dormancy and P_REV_IN_USE=7 after the handoff. In this figure, the terminal initiates the use of a new SR_ID after the handoff to a base station with higher P_REV.

Initially, the terminal establishes two data calls for SO 33 with a base station (with P_REV=6 or 7), which may or may not be base station 2. In general, any number of data calls (from 2 to 7) may have been established. Thereafter, these calls become dormant and the terminal is handed off to base station 1 during dormancy. The terminal thereafter originates a new data call for SO 7 with base station 1. While the SO 7 data call is still active, the terminal is handed off to base station 2. Since the P_REV_IN_USE=7 after the handoff, the active data call may be identified by an SR_ID. The terminal may initiate the use of a new SR_ID for the active data call after handoff using several schemes.

In a first scheme, after being handed off to base station 2, this base station releases the active (non-SO 33 ) data call by sending a Release Order Message to the terminal. Upon receiving this message, the terminal enters an idle state, listens to an Extended System Parameters Message (ESPM) with Packet Zone ID sent from base station 2, and detects that the packet zone has changed. The terminal may then originate a new data call for SO 3 via an Origination Message (ORM) with a proposed SR_ID. Base station 2 may accept the terminal request, in which case the SO 33 instance with the proposed SR_ID may be connected for the new data call.

In a second scheme, after the terminal is handed off to base station 2, this base station informs the terminal that the packet zone has changed by sending an In-Traffic System Parameters Message (ITSPM) with a new packet zone identifier (PZID), which indicates that the terminal is in a new packet zone with SO 33. The ITSPM may thus be used to trigger the terminal to re-originate the active data call using SO 33. The terminal receives the ITSPM and determines that it can upgrade its service option. The terminal may then originate a new SO 33 data call via an Enhanced Origination Message (EOM) requesting an SO 33 instance with a proposed SR_ID (which may be SR_ID=x or y, or a new SR_ID=z). Base station 2 may accept the terminal request, in which case the SO 33 instance with the proposed SR_ID may be connected for the new data call.

The first and second schemes represent two different mechanisms to inform the terminal that it can upgrade its service option for a data call. The ITSPM and EOM in the second scenario may be used if the terminal and base station are both associated with $P\_REV \geq 7$ (since the EOM is not supported by $P\_REV\_IN\_USE<7$).

Figure 5:
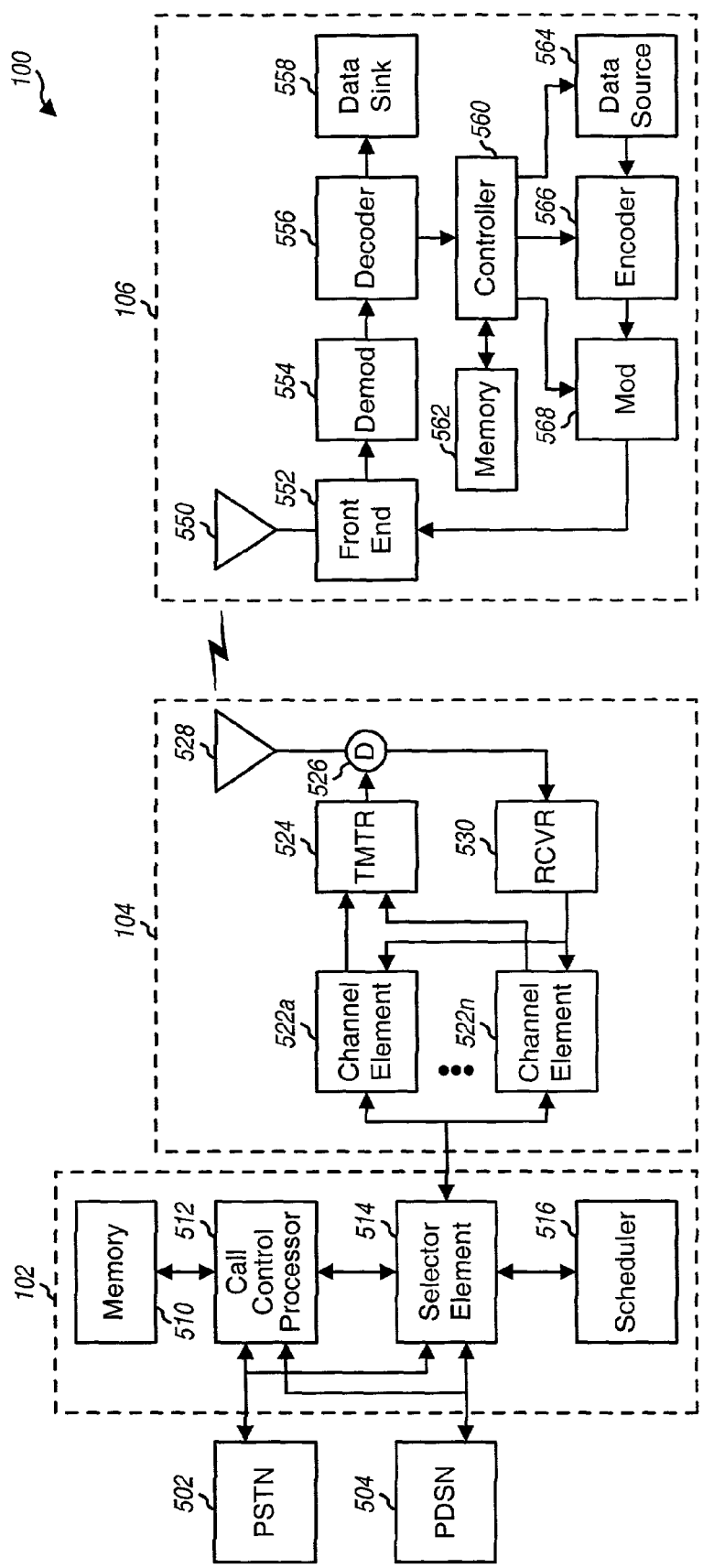
FIG. 5 is a block diagram of a specific embodiment of various network elements in a system.

FIG. 5 is a block diagram of a specific embodiment of various network elements in system 100. System 100 includes system controller 102 (which may be a mobile switching center (MSC) or a base system controller (BSC)) that communicates with a number of base stations 104 (only one base station is shown in FIG. 5 for simplicity). System controller 102 further interfaces with a public switch telephone network (PSTN) 502 (e.g., for voice services) and a packet data serving node (PDSN) 504 (e.g., for packet data services). System controller 102 coordinates the communication between the terminals in the wireless communication system and base stations 104, PSTN 112, and PDSN 114.

In the embodiment shown in FIG. 5, system controller 102 includes a call control processor 512, a number of selector elements 514 (only one selector element is shown in FIG. 5 for simplicity), and a scheduler 516. Call control processor 512 controls the call processing, service negotiation, service option negotiation, and so on, for each terminal. Call control processor 512 may implement various handoff techniques described above. One selector element 514 is assigned to control the communication between each terminal and one or more base stations (possibly of different P_REVs). Scheduler 516 couples to all selector elements 514 within system controller 102 and schedules data transmissions for packet data users. Memory unit 510 stores data and program codes used by call control processor 512 and possibly other units within system controller 102.

In the example design shown in FIG. 5, base station 104 includes a number of channel elements 522a through 522n. One channel element 522 is assigned to process the communication for each terminal and couples to the associated selector element 514 also assigned to the terminal. Each selector element 514 receives from scheduler 516 the schedule for the assigned terminal (e.g., the data rate, transmit power, and transmit time) and forwards the schedule to the associated channel element 522. Channel element 522 receives, encodes, and modulates (e.g., covers and spreads) data for the assigned terminal. The modulated data is then converted to one or more analog signals, quadrature modulated, filtered, and amplified by a transmitter (TMTR) 524 to provide a forward modulated signal, which is then routed through a duplexer 526 and transmitted via an antenna 528.

At the recipient terminal 106, the forward modulated signal is received by an antenna 550 and routed to a front-end unit 552. Front-end unit 552 filters, amplifies, downconverts, and digitizes the received signal to provide samples. The samples are then demodulated by a demodulator (Demod) 554, decoded by a decoder 556, and provided to a data sink 558. The demodulation and decoding are performed in a complementary manner to the modulation and encoding performed at the base station.

A controller 560 directs the operation of various elements within terminal 106 and further controls the call processing, service negotiation, service option negotiation, and so on for the terminal. Controller 560 may receive from decoder 556 decoded data for messages transmitted by the base stations, and may further provide data for messages to be transmitted to the base stations. Memory unit 562 stores data and program codes used by controller 560 and possibly other units within terminal 106.

Data transmission on the reverse link occurs in a similar manner. Data is provided from a data source 564, encoded by an encoder 566, and modulated by a modulator (Mod) 568 to provide modulated data. The modulated data is then converted to analog signals, upconverted, and conditioned by front-end unit 552 to provide a reverse modulated signal, which is then transmitted via antenna 550.

At base station 104, the reverse modulated signal is received by antenna 528, routed through duplexer 526, and provided to a receiver (RCVR) 530. Receiver 530 filters, amplifies, downconverts, and digitizes the received signal and provides samples to the channel element 522 assigned to the terminal. The assigned channel element 522 demodulates and decodes the data samples in a manner complementary to the modulation and encoding performed at the terminal. The decoded data may be provided to the selector element 514 assigned to the terminal, which may further forward the data to another base station 104, PSTN 502, or PDSN 504. The design, as described above, supports transmission for both voice and packet data over the system. Other designs may also be contemplated and are within the scope of the invention.

The processing (e.g., encoding and modulation) for the forward and reverse links are defined by the particular CDMA standard or system being implemented (e.g., IS-95A, IS-95B, and IS-2000).

The techniques described herein for supporting handoff of a terminal between base stations of different protocol revisions may be implemented by various means. For example, these techniques may be implemented in hardware, software, or a combination thereof. For a hardware implementation, the elements used to support handoff may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques for supporting handoff of a terminal between base stations of different protocol revisions may be implemented with modules (e.g., procedures, functions, and so on) that perform the functions described herein. The terminal and base stations (or network side) both perform the appropriate actions to achieve the handoff. The software codes for the terminal and network side may be stored in memory units (e.g., memories 562 and 510 in FIG. 5) and executed by processors (e.g., controller 560 and call control processor 512). Each memory unit may be implemented within the controller/processor or external to it, in which case the memory unit may be communicatively coupled to it via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. In a CDMA communication system, a method for supporting handoff of a terminal between base stations of different protocol revisions, comprising:
    performing a handoff of the terminal from a first base station to a second base station, wherein the handoff is performed while the terminal is in an active call with the first base station, wherein the first base station supports a first protocol revision and the second base station supports a second protocol revision that is later than the first protocol revision, wherein the terminal supports a terminal protocol revision, and wherein the protocol revision used between the terminal and second base station is the lower of the terminal protocol revision and the second protocol revision;
    determining if there is ambiguity at the terminal or the second base station as to which call is being processed; and
    maintaining the active call between the terminal and the second base station, wherein if there is ambiguity at the terminal or the second base station as to which call is being processed the second base station assigns an identifier to the active call and transmits the identifier to the terminal, and wherein if there is no ambiguity at the terminal or the second base station as to which call is being processed the second base station does not assign the identifier to the active call.

2. The method of claim 1, further comprising:
    establishing a second service configuration via the second base station, and wherein the active call is thereafter maintained using the second service configuration.

3. The method of claim 2, wherein the second service configuration is established after the handoff to the second base station.

4. The method of claim 2, wherein the second service configuration is established upon the second base station being added to an active set of the terminal.

5. The method of claim 2, wherein each service configuration comprises a particular service option instance to be used for an associated call.

6. The method of claim 5, wherein the first service configuration comprises a first service option instance for a low-speed packet data call.

7. The method of claim 5, wherein the second service configuration comprises a second service option instance for a high-speed packet data call.

8. The method of claim 5, wherein the first service option instance is an SO 7 or other low-speed packet data service option instance defined in IS-707.

9. The method of claim 5, wherein the second service option instance is an SO 33 instance defined in IS-707.

10. The method of claim 2, further comprising: assigning a service reference identifier (SR ID) for the active call.

11. The method of claim 1, further comprising: originating a new call via the second base station; and assigning two service reference identifiers for the active call and the new call.

12. The method of claim 1, wherein each protocol revision corresponds to a particular CDMA standard release.

13. The method of claim 1, wherein the first protocol revision corresponds to IS-95B or an earlier standard release (P_REV≦5).

14. The method of claim 1, wherein the second protocol revision corresponds to IS-2000 Release 0 or a later standard release (P_REV≧6).

15. In a CDMA communication system, a method for supporting handoff of a terminal between base stations of different protocol revisions, comprising:
    performing a, handoff of the terminal from a first base station to a second base station, wherein the handoff is performed while the terminal is in an active call with the first base station using a first service configuration established in accordance with a first protocol revision, wherein the first base station supports the first protocol revision and the second base station supports a second protocol revision that is later than the first protocol revision, wherein the terminal supports a terminal protocol revision, and wherein the protocol revision used between the terminal and second base station is the lower of the terminal protocol revision and the second protocol revision;
    releasing the active call by the second base station;
    receiving a request to originate a new call with a second service configuration;
    determining if there is ambiguity at the terminal or the second base station as to which call is being processed;
    assigning an identifier to the new call if there is ambiguity at the terminal or the second base station as to which call is being processed, wherein the identifier identifies a second service configuration, and wherein if there is no ambiguity at the terminal or the second base station as to which call is being processed the identifier is not assigned to the active call; and
    maintaining the new call between the terminal and the second base station using the second service configuration.

16. The method of claim 15, wherein the request is received via an Origination Message.

17. The method of claim 15, wherein the first protocol revision corresponds to IS-95B or an earlier standard release (P_REV≦5) and the second protocol revision corresponds to IS-2000 Release 0 or a later standard release (P_REV≧6).

18. In a CDMA communication system, an apparatus for supporting handoff of a terminal between base stations of different protocol revisions, comprising:
    means for performing a handoff of the terminal from a first base station to a second base station, wherein the handoff is performed while the terminal is in an active call with the first base station, wherein the first base station supports a first protocol revision and the second base station supports a second protocol revision that is later than the first protocol revision, wherein the terminal supports a terminal protocol revision, and wherein the protocol revision used between the terminal and second base station is the lower of the terminal protocol revision and the second protocol revision;

means for determining if there is ambiguity at the terminal or the second base station as to which call is being processed; and means for maintaining the active call between the terminal and the second base station, wherein if there is ambiguity at the terminal or the second base station as to which call is being processed the second base station assigns an identifier to the active call and transmits the identifier to the terminal, and wherein if there is no ambiguity at the terminal or the second base station as to which call is being processed the second base station does not assign the identifier to the active call.

19. The apparatus of claim 18, further comprising: means for establishing a second service configuration via the second base station, and wherein the active call is thereafter maintained using the second service configuration.

20. The apparatus of claim 19, wherein the second service configuration is established after the handoff to the second base station.

21. The apparatus of claim 19, wherein the second service configuration is established upon the second base station being added to an active set of the terminal.

22. The apparatus of claim 19, wherein each service configuration comprises a particular service option instance to be used for an associated call.

23. The apparatus of claim 22, wherein the first service configuration comprises a first service option instance for a low-speed packet data call.

24. The apparatus of claim 22, wherein the second service configuration comprises a second service option instance for a high-speed packet data call.

25. The apparatus of claim 22, wherein the first service option instance is an SO 7 or other low-speed packet data service option instance defined in IS-707.

26. The apparatus of claim 22, wherein the second service option instance is an SO 33 instance defined in IS-707.

27. The apparatus of claim 19, further comprising: means for assigning a service reference identifier (SR ID) for the active call.

28. The apparatus of claim 18, further comprising: means for originating a new call via the second base station; and means for assigning two service reference identifiers for the active call and the new call.

29. The apparatus of claim 18, wherein each protocol revision corresponds to a particular CDMA standard release.

30. The apparatus of claim 18, wherein the first protocol revision corresponds to IS-95B or an earlier standard release (P_REV$\leq$5).

31. The apparatus of claim 18, wherein the second protocol revision corresponds to IS-2000 Release 0 or a later standard release (P_REV$\geq$6).

32. The method of claim 1, wherein the identifier is sent to the terminal in a service configuration record that is included in either a service connect message or a universal handoff direction message, and wherein the identifier is not used until the second base station sends either the service connect message or the universal handoff direction message with the new service configuration record assigned.

33. An apparatus for supporting handoff of a terminal between base stations of different protocol revisions, comprising:

a memory; and a processor communicatively coupled to the memory, the processor tapable of interpreting digital information to:

perform a handoff of the terminal from a first base station to a second base station, wherein the handoff is performed while the terminal is in an active call with the first base station, wherein the first base station supports a first protocol revision and the second base station supports a second protocol revision that is later than the first protocol revision, wherein the terminal supports a terminal protocol revision, and wherein the protocol revision used between the terminal and second base station is the lower of the terminal protocol revision and the second protocol revision;

determine if there is ambiguity at the terminal or the second base station as to which call is being processed; and maintain the active call between the terminal and the second base station, wherein if there is ambiguity at the terminal or the second base station as to which call is being processed the second base station assigns an identifier to the active call and transmits the identifier to the terminal, and wherein if there is no ambiguity at the terminal or the second base station as to which call is being processed the second base station does not assign the identifier to the active call.

34. The apparatus of claim 33, wherein the processor is further capable of interpreting digital information to:

establish a second service configuration via the second base station, and wherein the active call is thereafter maintained using the second service configuration.

35. The apparatus of claim 32, wherein the second service configuration is established after the handoff to the second base station.

36. The apparatus of claim 32, wherein the second service configuration is established upon the second base station being added to an active set of the terminal.

37. The apparatus of claim 32, wherein each service configuration comprises a particular service option instance to be used for an associated call.

38. A non-transitory computer-readable medium encoded with a computer program for supporting handoff of a terminal between base stations of different protocol revisions, comprising:

code for performing a handoff of the terminal from a first base station to a second base station, wherein the handoff is performed while the terminal is in an active call with the first base station, wherein the first base station supports a first protocol revision and the second base station supports a second protocol revision that is later than the first protocol revision, wherein the terminal supports a terminal protocol revision, and wherein the protocol revision used between the terminal and second base station is the lower of the terminal protocol revision and the second protocol revision;

code for determining if there is ambiguity at the terminal or the second base station as to which call is being processed; and code for maintaining the active call between the terminal and the second base station, wherein if there is ambiguity at the terminal or the second base station as to which call is being processed the second base station assigns an identifier to the active call and transmits the identifier to the terminal, and wherein if there is no ambiguity at the terminal or the second base station as to which call is being processed the second base station does not assign the identifier to the active call.

39. The non-transitory computer-readable medium of claim 38, further comprising:

code for establishing a second service configuration via the second base station, and wherein the active call is thereafter maintained using the second service configuration.

40. The non-transitory computer-readable medium of claim 39, wherein the second service configuration is established after the handoff to the second base station.

41. The non-transitory computer-readable medium of claim 39, wherein the second service configuration is established upon the second base station being added to an active set of the terminal.

42. The non-transitory computer-readable medium of claim 39, wherein each service configuration comprises a particular service option instance to be used for an associated call.

* * * * *